United States Patent Office 3,106,405
Patented Oct. 8, 1963

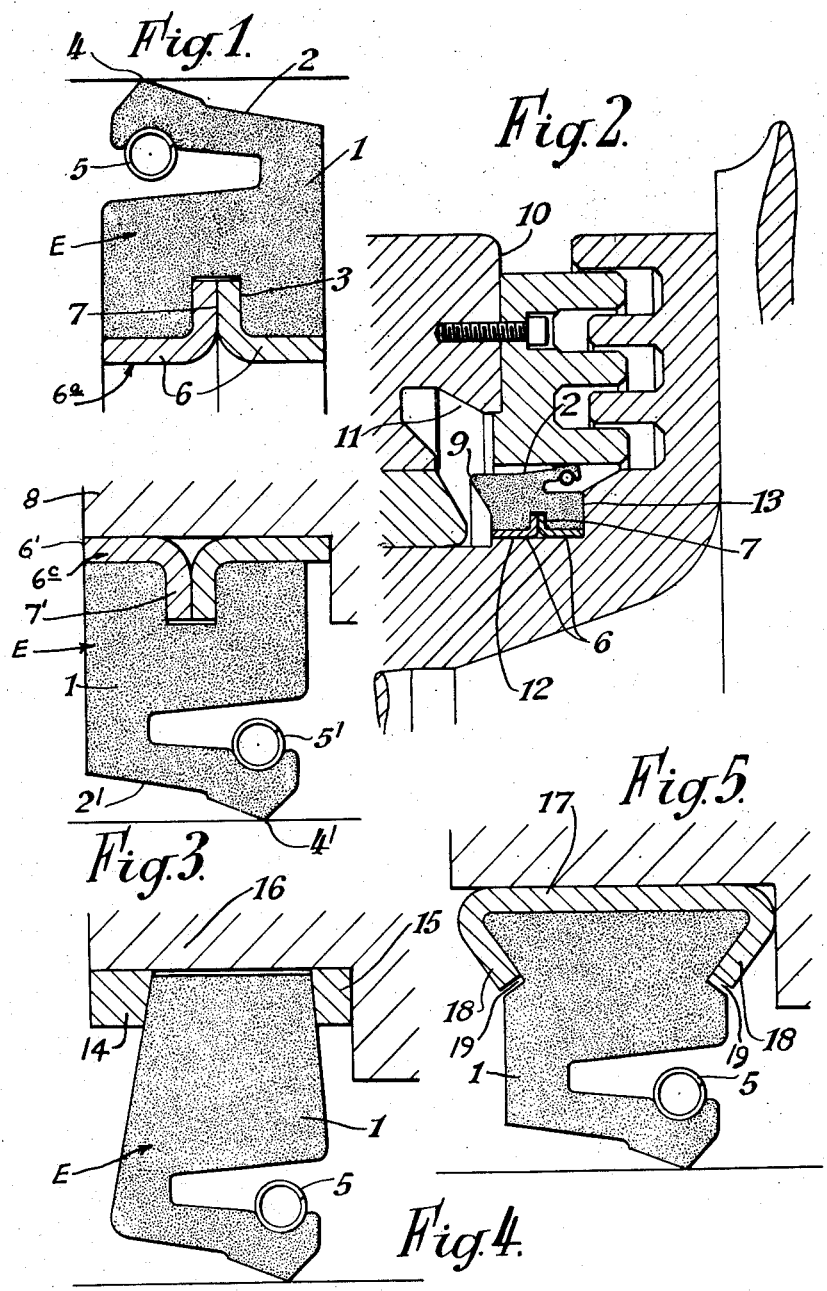

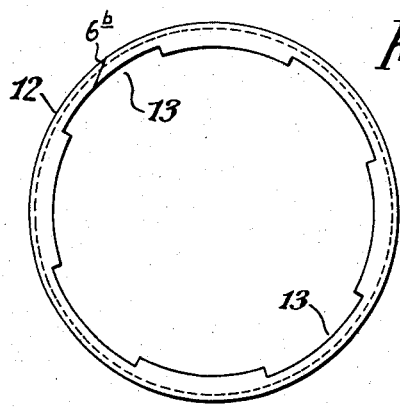
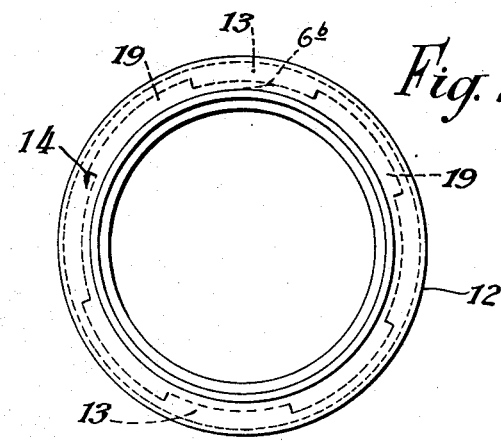

3,106,405
ROTARY SHAFT SEALING RING HAVING REMOVABLE METAL ANNULUS SUPPORTED ELASTIC SEAL
James Maitland Pringle, Lower Walton, near Warrington, England, assignor to U.S. Industries Inc. Engineering Limited
Filed June 20, 1960, Ser. No. 37,427
Claims priority, application Great Britain July 3, 1959
4 Claims. (Cl. 277—153)

This invention relates to sealing rings for shaft bearings and the like for the confining of lubricant and/or for the exclusion of dust. The invention is concerned mainly with sealing rings for relatively larger bearings such as those provided for the necks or trunnions of rolls in a rolling mill. The invention will be described mainly in that connection but it is of course applicable also to other and smaller bearings.

Seals for the rolls of rolling mills as hitherto known have usually been relatively expensive, cumbersome to mount and to remove and, what is more serious, they are frequently damaged by the accidental contact between them and the roll when they and a bearing assembly, suspended in a crane sling, are being placed into or taken from position on the roll. For example, a heavy bearing and seal assembly swinging from a crane and bumping against the roll with a seal of known construction having a metal casing can quite readily deform such casing, thereby making the seal imperfect and allowing the exit of lubricant when the roll and seal are reassembled.

Further, since these rolls have to be removed and replaced frequently because of wear, distortion, etc., the necessary dismantling and replacement of the bearing seals as hitherto known has involved considerable time and some skill.

The present invention, therefore, aims at providing a relatively simple, less expensive and less fragile seal for use in the circumstances named without damage to itself.

A sealing ring according to this invention contemplates a seating, usually a plain cylindrical seating, in the bearing structure (for an internal seal) or on the roll neck (for an external seal) and comprises one or more retaining rings for insertion into or on to such seating and a relatively block-sectioned rubber ring or grommet shaped part to engage said retaining ring and formed with a resilient sealing lip, said block-sectioned ring or grommet being sufficiently flexible to be "snapped" into and from position relatively to said ring or rings but sufficiently rigid to present the said sealing lip or lips to the shaft with a sealing pressure.

With such a seal in place in a bearing housing or on a roll neck as the case may be there is no metal casing exposed to damage in the event of a collision between the roll and bearing. The shock of any such collision is taken by the substantially rectangular-sectioned rubber mass which is not deformed thereby.

In many cases the said retaining ring or rings will be of a springy nature (normally of steel) and will be retained in or on said seating by reason of its or their own resilience. They may however be more firmly held in position as by welding or by the use of screw. In some cases the said rings may be formed on the seating itself but this is not preferred since when damaged as by collision with a roll end they may need to be machined out, which is an expensive operation, whereas the inserted prefabricated rings may easily be removed and replaced if damaged.

The invention may include the feature that the said retaining ring comprises a radially-directed flange or flanges on a cylindrical portion, which flange or flanges may be centrally disposed on said cylindrical portion, to enter a peripheral groove in the rubber ring or grommet, or they may be at the edge of such cylindrical portion to receive the rubber ring or grommet between them. In the former case two angle-sectioned rings may be welded or otherwise secured together back to back to form a ring of substantially T cross section.

As an alternative, two separate spring rings may be inserted in the housings, with the rubber ring or grommet removably inserted between them. The abutting faces of these rings may be tapered so that any tendency of the rubber to swell will tighten the grip of the retaining rings on it.

When the improved seal is intended to be seated on a roll neck to rotate with it the rubber portion may be extended at one face to form a flinger ring to throw off any oil which has crept through the bearing to the seal.

In all forms of the improved seal there may be means in the form of mutually interengaging parts of the rubber ring and retaining ring to prevent relative rotation between those rings. Such means may comprise one or more notches or gaps in one ring and a corresponding lug or lugs on the other ring, but all shaped so as not to hamper the manual fitting and removal of the rubber ring to and from the retaining ring when necessary.

According to a further feature of the invention, the rubber mix used for the making of the said flexible sealing ring includes a slow-acting swelling agent which, under the influence of any lubricant coming into contact with the seal when in use, and/or by an ageing process, causes the rubber to swell slightly. The radial expansion due to this swelling causes the ring to seal itself more tightly in the housing and prevent oil creeping through the joint.

There may be reinforcement moulded into the rubber ring, either of metal, plastic, textile fabric or the like.

As the main bulk of the seal is of a resilient nature the seal is less easily damaged by collision than are the known seals and, if damaged, the substitution of a new one is a matter of relatively little expense. The removal and replacement of the seal, for the extraction and refitting of the roll can be carried out quickly and easily.

The invention will now be described in more detail with reference to the accompanying drawings, wherein:

FIG. 1 is a cross section through one form of the improved seal as adapted to be held on the neck of a roll;

FIG. 2 is a similar view of another form of the seal and including surrounding parts of the roll and bearing;

FIG. 3 is a view similar to FIG. 1 but showing a seal adapted to be held in a bearing housing;

FIGS. 4 and 5 are views corresponding to FIG. 3, showing two other forms of seal for use in a bearing housing; and FIG. 6 is a face view of a modified form of retaining ring; whilst FIG. 7 is a face view of a complete seal embodying the retaining ring of FIG. 6.

Referring first to FIG. 1, the form of seal, or sealing ring there shown, is for an external seal and comprises a single rubber ring element E, having a main body part 1 of substantially rectangular section with its longer dimension in the radial direction, with a sealing lip of normal form projecting from the radially outer side and with a rectangular-sectioned groove 3, formed in the radially inner side. By way of illustration, useful dimensions for the block-like section of this ring are 1" radially and ¾" or ⅞" axially. The sealing lip 2 is shaped to present a sealing edge 4 and on its inner side carries a garter spring 5 in known manner.

The retaining member comprises a pair of angle-sectioned metal split ring 6, spot welded together back to back so as to provide a relatively wide annular band 6a from the radially outwardly directed side of which projects the flange 7 which is adapted to enter the said rectangular groove 3 in the rubber element.

The metal rings 6 are split, as above stated and as indicated at 6b in FIG. 6, and dimensioned that they require to be expanded in diameter in order to be placed on to the seating of a roll neck and, when in position and released, they exert a radially-inward pressure on the roll neck which keeps them in place whilst the rubber ring element is being applied to them and removed from them.

In assembling the seal, the retaining members 6 are first placed in position on the roll neck as mentioned above. Then the rubber sealing element E is applied to them, its inner edge being brought against the said retaining member so that the flange 7 of the latter fits into the groove 3 in the rubber element, and the interfitting of these two parts is worked around the seal until the last portion of the rubber element can be snapped over the metal flange 7, whereby the rubber element becomes firmly held in place on the roll neck. The radial dimension of the flange 7 is such, in relation to the available space between the roll neck and the housing surface, that the rubber ring element 1 can be worked into and out of position on the spring ring retaining member without undue difficulty, and is effectively held to the spring ring member when in place.

FIG. 3 shows a reversed arrangement, for an internal seal where the metal retaining split rings 6' forming the retaining member 6c with flange 7' are seated in a bearing housing 8. The sealing lip 2' with sealing edge 4' and garter spring 5' are in this instance at the radially-inner side of the main body part 1.

Referring now to FIG. 2, the resilient body 1 of the seal is shaped at the axially directed outer face to provide a flinger ring 9. The adjacent bearing housing 10 has a cavity 11 around the roll neck to receive and collect (by drainage) any oil flung off by the ring 9. In this case the sealing ring is shown held by its own resilience on to a seating 12, and abutting a shoulder 13.

In the modified form of seal shown in FIG. 4, which is an internal seal, two separate split spring rings 14, 15 are placed in the bearing housing 16, spaced from each other and the main body part 1 of the annular rubber element E is caused to fit between them. The meeting faces of such split rings and the corresponding faces of the rubber element are tapered, giving the rubber element a wedging action so that any radial expansion and/or compression of the body part 1 causes it to be the more firmly held in place. This form of the invention may be equally well adapted in an external seal.

Referring to FIG. 5, which also shows an internal seal, a single retaining member 17 is provided, of channel section and with its side walls 18 converging towards each other. The rubber element body part 1 has a rebate 19 at each outer corner, with side walls tapered correspondingly with the walls 18, forming a dovetail-sectioned portion to fit into the channel of the retaining member 17. The angle of inclination of the walls 18 is such that the dovetail sectioned part of the rubber body 1 can be worked into and out of the channel 17 readily and is effectively held by the channel when in position.

The sealing lip 2 in any of the forms of the invention may be directed inwardly or outwardly of the bearing, as desired, and in some cases two seals may be arranged back to back with their sealing lips directed in the same or opposite radial directions and/or in the same or opposite axial directions.

Referring finally to FIGS. 6 and 7, a ring 12, corresponding to a ring 6 of FIG. 1 is shown as having its radial flange notched at 13'. The rubber ring element 14 is formed with corresponding lugs or enlargements 19 (FIG. 7) which, when the seal is assembled fill the said notches 13' whereby relative rotation between the rubber ring element and its retaining ring or rings is prevented. These notches and projections may be in any desired number and location and may take other forms than that shown. In an arrangement such as is shown in FIG. 5, one or both the flanges 18 could be notched and tongues bent inwards, the rubber body part 1 being formed with recesses or sockets to receive those tongues. Alternatively, apertures may be formed in the said flanges to receive complemental lugs or enlargements formed on the rubber.

The term rubber as used herein is intended to include any normal rubber composition or rubber-substitute useful for sealing purposes.

It will be seen that in all cases the improved seal, for use around the neck of a roll of a rolling mill or the like comprises two mutually attachable/separable parts the attachment and separation of which can be carried out manually and the parts having inter-engaging portions preventing relative axial displacement when the parts are attached to each other, one of said parts consisting of a spring ring or rings adapted when stressed to be placed in position and when relieved to hold itself in position as a retaining member, and the other of said parts being a resilient ring or grommet of sufficient bulk not to be damaged by accidental collision between the roll and bearing and carrying an annular sealing lip.

What I claim is:

1. A sealing ring for a rotary shaft, comprising a retaining member in the form of a relatively wide, split, resilient metal annulus having radially inwardly and outwardly directed sides and having axially directed ends and further having a flange approximately midway between said ends on and projecting radially from one of said radially directed sides, a single annulus, resilient rubber element having axial length and having radially directed inner and outer sides and further having a solid main body part of substantially rectangular cross section and having radial thickness substantially corresponding to the axial length of the body, one of said radially facing sides of said annular rubber element being defined by an encircling sealing lip having a width in the axial direction of the rubber element substantially equal to the axial length of the rubber element and having a maximum thickness materially less than the radial thickness of said main body part, the lip having an edge joined to the main body part and having an opposite free edge, resilient expander means between the lip and said main body part and bearing against the inner side of the lip adjacent to the said free edge of the lip, said retaining member and said annular rubber element fitting concentrically one within the other with one radially facing side of the annular rubber element held by its inherent resiliency, firmly in contact with that radially facing side of said retaining member from which said flange projects, and the last mentioned radially facing side of the annular rubber element having a groove therein in which said flange is engaged.

2. A sealing ring for a rotary shaft, comprising a retaining member in the form of a relatively wide, split, resilient metal annulus having radially inwardly and outwardly directed sides and having axially directed ends and further having a flange approximately midway between said ends on and projecting radially from one of said radially directed sides, a single annular, resilient rubber element having axial length and having radially directed inner and outer sides and further having a solid main body part of substantially rectangular cross section and having radial thickness substantially corresponding to the axial length of the body, one of said radially facing sides of said annular rubber element being defined by an encircling sealing lip having a width in the axial direction of the rubber element substantially equal to the axial length of the rubber element and having a maximum thickness materially less than the radial thickness of said main body part, the lip having an edge joined to the main body part and having an opposite free edge, resilient expander means between the lip and said main body part and bearing against the inner side of the lip adjacent to the free edge of the lip, said retaining member and said annular rubber element fitting concentrically one within the other with one radially facing side of the annular rubber element held by its inherent resiliency, firmly in contact with that radially facing side of said retaining member from which said flange projects, the last mentioned radially facing side of the annular rubber element having a groove therein in which said flange is removably positioned, said annular rubber element having an elasticity such as to permit working the element onto and off of the retaining member to position the flange in and remove it from the groove, and interconnecting means between the retaining member and the annular rubber element, for maintaining the retaining member and the annular rubber element against relative rotational movement.

3. The invention according to claim 2, wherein the said main body part of the annular rubber element is formed at the end thereof which is adjacent to the edge of the lip joined to the said main body part, with an oil flinger ring projecting axially of the said body part in the direction opposite to the said free edge of the sealing lip.

4. The invention according to claim 2, wherein the said retaining member is formed in two sections and said flange consists of an angled portion of each section and said angled portions being rigidly joined together whereby the flange is of approximately double the thickness of each of the said two sections.

References Cited in the file of this patent

UNITED STATES PATENTS

| | | |
|---|---|---|
| 2,274,234 | Ekkebus et al. | Feb. 24, 1942 |
| 2,397,847 | Dodge | Apr. 2, 1946 |
| 2,872,229 | Waser | Feb. 3, 1959 |
| 2,990,201 | Stephens | June 27, 1961 |
| 3,003,799 | Marchionda et al. | Oct. 10, 1961 |

FOREIGN PATENTS

| | | |
|---|---|---|
| 569,821 | Great Britain | June 11, 1945 |
| 572,055 | Great Britain | Sept. 20, 1945 |
| 1,145,882 | France | May 13, 1957 |